(12) United States Patent
Nakata et al.

(10) Patent No.: US 6,407,968 B1
(45) Date of Patent: Jun. 18, 2002

(54) OPTICAL INFORMATION RECORDING/ REPRODUCING APPARATUS HAVING FOCUS ERROR SIGNAL COMPENSATION

(75) Inventors: Yasuo Nakata, Takaichi-gun; Hiroshi Fuji, Soraku-gun; Nobuo Ogata, Nara, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/197,663

(22) Filed: Nov. 23, 1998

(30) Foreign Application Priority Data

Nov. 27, 1997 (JP) ............................................. 9-326623

(51) Int. Cl.$^7$ ................................................. G11B 7/00
(52) U.S. Cl. ............................... 369/44.26; 369/44.34; 369/53.28
(58) Field of Search .......................... 369/44.25, 44.26, 369/44.29, 94, 214.27, 44.34, 53.28

(56) References Cited

U.S. PATENT DOCUMENTS

| | | | |
|---|---|---|---|
| 5,949,745 A | * | 9/1999 | Kim ......................... 369/44.26 |
| 5,953,296 A | * | 9/1999 | Baba ........................ 369/44.26 |
| 5,999,502 A | * | 12/1999 | Nakata et al. ............. 369/44.26 |
| 6,044,049 A | * | 3/2000 | Fujiune et al. ............ 369/44.26 |
| 6,091,678 A | * | 7/2000 | Fushimi et al. ........... 369/44.26 |
| 6,240,055 B1 | * | 5/2001 | Takamine et al. ........ 369/44.29 |

FOREIGN PATENT DOCUMENTS

| | | |
|---|---|---|
| JP | 4-167235 | 6/1992 |
| JP | 6-36313 | 2/1994 |
| JP | 0830975 A | 2/1996 |
| JP | 08180429 A | 12/1996 |
| JP | 9-147383 | 6/1997 |
| JP | 9-231588 | 9/1997 |

\* cited by examiner

*Primary Examiner*—Nabil Hindi
(74) *Attorney, Agent, or Firm*—Nixon & Vanderhye P.C.

(57) ABSTRACT

A light spot detects a focus offset amount based on an amount of variation of a focus error signal when a light spot passes a boundary between a land section and a groove section adjacent to the land section on an optical disk. Specifically, an amount of variations in the focus error signal at a center of a land section at a time the light spot passes the boundary between the land and the groove adjacent to the land is detected as a focus offset amount, and an amount of variation in the focus error signal at a center of the groove section is detected as a focus offset amount for the groove sections, thereby providing an optical information recording/reproducing device which permits recording/ reproducing information on and from a tracking area of an optical disk under just-in-focus conditions without increasing a cost of the device nor being affected by an error due to changes over time or variations in optical disks.

29 Claims, 10 Drawing Sheets

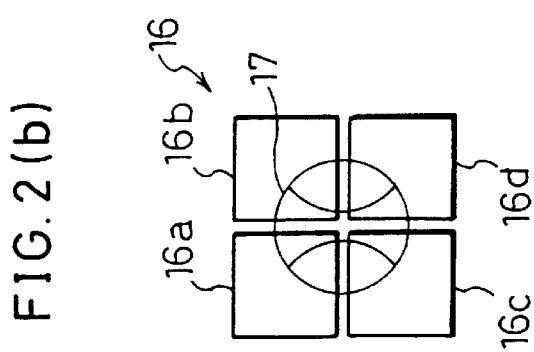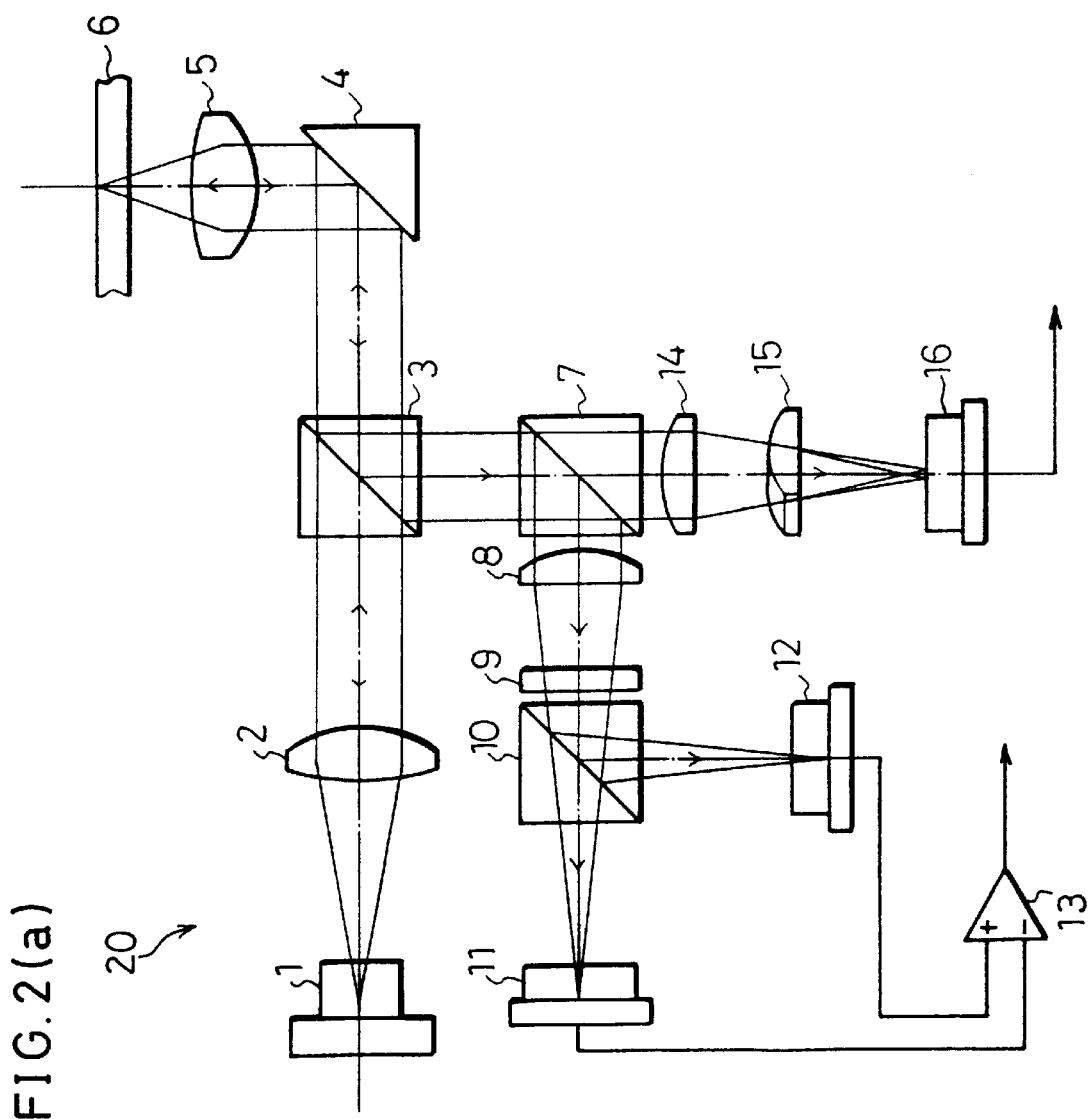

OPTICAL INFORMATION RECORDING/ REPRODUCING APPARATUS HAVING FOCUS ERROR SIGNAL COMPENSATION

FIELD OF THE INVENTION

The present invention relates to an optical information recording/reproducing device for recording/reproducing information on/from an optical disk using a laser beam, and more particularly relates to an optical information recording/ reproducing device for recording/reproducing information on/from both land sections and groove sections of the optical disk.

BACKGROUND OF THE INVENTION

An optical disk device as an example of an optical information recording/reproducing device performs recording/reproducing of information in the following manner. That is, a light beam emitted from a semiconductor laser (light source) is converged by an objective lens (converging means) to form a light spot, and a tracking of the resulting light spot is performed along tracks formed on the optical disk, whereby information is recorded or reproduced based on the resulting signal.

To realize the described recording/reproducing operations, on the optical disk for recording thereon and reproducing therefrom information, tracks (guide grooves) are formed beforehand so that a tracking of the light spot can be performed along the tracks. Hereinafter, the groove sections where the tracks are formed are simply referred to as the groove sections, and the regions between adjacent grooves are referred to as land sections.

In the conventional optical disk devices, recording/ reproducing of information are performed with respect to either the land sections or the groove sections of the optical disk. In recent years, however, the method for recording information both on the groove sections and the land sections on the optical disk has been proposed, which realizes an improved recording density of twice as high as that of the conventional optical disks.

However, in the described optical disk devices designed for recording/reproducing information on/from both the groove sections and the land sections on the optical disk, a problem arises in that an interference occurs as a tracking error signal is transferred to a focus error signal. This is known as a track interference, or a crosstalk between error signals, and hereinafter referred to as a crosstalk between error signals.

Due to the described crosstalk between error signals, a problem arises in that an optimal focus offset amount differs between (1) when a tracking is carried out with respect to the groove sections with the light spot resulting from converging light emitted from the semiconductor laser by the objective lens and (2) when a tracking is carried out with respect to the land sections with the light spot. For this difference in optimal focus offset amount, if the same servo control amount is used for both cases, an optimal focal position cannot be obtained, resulting in the problem that optimal recording/reproducing cannot be performed.

The reason why a difference in focus offset amount exists between when tracking the land sections and when tracking the groove sections will be explained in reference to FIG. 10.

FIG. 10 shows the focus error signal and the tracking error signal obtained from the optical pickup and these servo error signals are shown in the state where only the focus servo is set ON. The servo error signals (focus error signal and tracking error signal) are shown so as to correspond to error signals at respective positions of the spot as converged on the optical disk 66 by the objective lens (groove sections 66a and land sections 66b shown in the figure) of the optical disk 66.

As shown in the FIG. 10, generally, the focus error signal is affected by the tracks on an optical disk 66, and has the same period as the tracking error signal, but has a different phase from that of the tracking error signal. This can be observed when the frequency band $f_F$ of the focus servo is smaller than the track cross frequency $f_{TC}$ generated due to the eccentricity of the track.

The described deviations in the focus error signal is known as a crosstalk between error signals. The crosstalk occurs by the following mechanism. On the photodetector which generates a servo error signal, a reflected light from the optical disk is affected by aberrations of the optical components of the optical pickup, particularly the objective lens. As a result, an asymmetrical property is attributed to the reflected light, and thus tracking error signal leaks into the focus error signal, thereby generating a crosstalk between the error signals.

According to the servo control of the optical disk device, generally, the tracking servo is set ON after setting ON the focus servo. Therefore, as can be seen from the servo error signal shown in FIG. 10, by the effect of the crosstalk between error signals, when a tracking of the land sections 66b is performed with the light spot, the focal point is L as indicated in FIG. 10. On the other hand, when a tracking of the groove sections 66a is performed with the light spot, the focal point is G as indicated in FIG. 10.

As described, the focal point differs between when tracking the land sections 66b and when tracking the groove sections 66a. Therefore, if the focus servo is carried out with the same amount of servo control for both the groove sections 66a and the land sections 66b, a deviation in the direction of an optical axis (focus offset) occurs as indicated by 1+g, and an optimal focus offset amount differs.

Accordingly, the inventors of the present application disclose in the Japanese Unexamined Patent Publication No. 180429/1996 (Tokukaihei 8-190429) (U.S. patent application Ser. No. 08/539,523) the structure of switching the amount of servo control of the focus servo between when tracking the groove sections and when tracking the land sections.

Specifically, the respective focus offset amounts for the land sections and the groove sections are stored. Then, when tracking the groove sections, the focus servo is carried out by compensating the focus error signal based on the focus offset amount set for the groove sections. On the other hand, when tracking the land sections, the focus servo is carried out by compensating the focus error signal based on the focus offset amounts set for the land sections. As a result, the information can be recorded/reproduced in the tracking area of the optical disk under just-in-focus conditions.

The focus offset amount may be set by the following methods ① and ②.

Method ①: The focus offset amount is set based on the crosstalk between error signals at a time of assembling the optical pickup.

As described earlier, an optimal focal position differs between the land sections and the groove sections for the crosstalk between error signals of the optical pickup. Therefore, using the reference disk, by the crosstalk between the error signals obtained at a time of assembling the optical pickup, the respective optimal focal positions for the land sections and the groove sections are determined.

The method ②: the focus offset amount is set based on a reproducing signal obtained at a time of starting up an optical disk device.

After activating the optical disk device, before carrying out recording/reproducing information, a reproducing of signal (test reading) is carried out with variable focus offset, and the respective focus offset amounts for the land sections and the groove sections which maximize the resulting reproducing signal are calculated respectively.

The described method ① of setting the focus offset amount based on the error signal crosstalk obtained at a time of assembling the optical pickup and the method ② of setting the focus offset amount based on a reproducing signal generated when starting the optical disk device have the following problems.

When adopting the method ①, in an event that an amount of crosstalk between error signals varies due to changes over time of the optical pickup, an appropriate focus offset amount cannot be obtained, thereby presenting the problem that an optimal focus servo cannot be carried out. Furthermore, in this method, as a reference disk is used, if there exist variations between the reference disk and optical disks to be actually used, the above error occurs, resulting in the problem that an optimal focus servo cannot be carried out.

According to the method ②, although the problem associated with an error occurred when adopting the method ① does not occur, the following problem may arise. That is, for the test reading, it is required to change the focus offset amount, and therefore an additional time is required for the test reading at a time of starting up the device. Additionally, since it is required to carry out a system control for carrying out a test reading with variable focus offset amount, a cost of the device increases.

Japanese Unexamined Patent Publication No. 30975/1996 (Tokukaihei 8-30975) discloses a method of setting an offset amount which offers an optimal reproducing signal (signal amplitude or error rate) by carrying out a test reading with variable focus offset amount after starting up an optical disk device before carrying out recording/reproducing of information as in the described method ②. The method of this citation also raise the problems associated with the method ②.

SUMMARY OF THE INVENTION

It is an object of the present invention to provide an optical information recording/reproducing device which permits recording/reproducing information on and from a tracking area of an optical disk under just-in-focus conditions without increasing a cost of the device nor being affected by an error due to changes over time or variations in optical disks.

In order to achieve the above object, an optical information recording/reproducing device for recording/ reproducing information by converging light on a recording medium including land sections and groove sections and detecting a light reflected therefrom using an optical pickup is characterized by including:

offset amount detection means for detecting a focus offset amount based on variations in amount of a focus error signal at a time a light beam crosses a boundary between a land section and a groove section adjacent to the land section, and focus error signal compensation means for obtaining respective optimal focal positions for the land sections and the groove sections by compensating the focus error signal based on the focus offset amount as detected by the offset amount detection means.

According to the described arrangement, the offset amount detection means detects a focus offset amount based on variations in amount of a focus error signal obtained at a time a light spot crosses a boundary between the land section and the groove section adjacent to the land section. The focus error signal in the ON state of the focus servo varies as being affected by the crosstalk between error signals, and thus respective focus offset amounts of the land sections and the groove sections can be detected based on variations in amount of the focus error signal. Namely, in the state where there exits an eccentricity of the tracks formed by the land sections and the groove sections on the optical disk, only the focus servo is set ON, and respective focus offset amounts can be detected at a zero-cross timing of the tracking error signal obtained at a time the light spot crosses the track.

Based on the focus offset amount as detected by the offset amount detection means, the compensation means compensates a focus error signal. Therefore, recording and reproducing of information can be carried out in an optimal focal position at just-in-focus with respect to both the land sections and the groove sections, thereby obtaining a quality reproducing signal.

Since the described detection of the focus offset amount can be carried out without difficulties within the normal time required for starting up the device, the problems associated with the conventional device that a cost of the device increases, or a longer time is required to start up the device can be eliminated. Additionally, since a focus error signal can be compensated by detecting a focus offset amount for each optical disk, unlike the conventional arrangement of setting the focus offset amount based on the crosstalk between error signals obtained at a time of assembling an optical pickup using a reference disk, problems caused by errors due to variations over time and variations of optical disks can be avoided.

The described optical recording/reproducing device may be arranged so as to further include a comparator for inputting thereto a tracking error signal when the light spot passes a boundary between the land section and the groove section adjacent to the land section and sampling means for sampling a focus error signal in the ON state of a focus servo based on an output of the comparator.

In the described arrangement, it may be further arranged such that the comparator outputs a signal whose level varies at a center of each land section as a result of comparison with a predetermined reference level, and the sampling means samples a focus error signal when varying an output signal from said comparator.

According to the described arrangement, the comparator outputs a signal whose level varies at a center of each land section as a result of comparison with a predetermined reference level, and the sampling means samples a focus error signal when varying an output signal from said comparator.

To the comparator, input is an tracking error signal obtained when the light spot passes a boundary between a land section and the groove section adjacent to the land section. With an appropriate selection for the reference level, the output level can be varied at respective centers of the land section and the groove section. The sampling means can obtain the respective focus offset amounts for the land sections and the groove sections by sampling amounts of variations at respective centers of the land sections and the groove sections by sampling the focus error signal at a time the level of the output signal from the comparator varies.

The optical information recording/reproducing device of the present invention may be arranged so as to further include the second signal generation means for generating a second signal of the focus error signal which has a phase difference from a tracking error signal of 90°, the second signal showing its peak values at the center of each land section and the center of each groove section in the ON state of the focus servo at a time the light spot crosses the boundary between the land section and the groove section adjacent to the groove section, and by sampling the peak and the bottom of the envelope of the focus error signal, the respective focus offset amounts of the land section and the groove section can be detected.

As being affected by the crosstalk between the error signals, the focus error signal may vary with a phase difference of 90° from the tracking error signal. Therefore, the focus error signal shows a peak value and a bottom value at a zerocross timing of the tracking error signal. Then, by sampling the peak and the bottom by detecting the envelope of the focus error signal, the focus offset amounts of the land section and the groove section can be detected.

For a fuller understanding of the nature and advantages of the invention, reference should be made to the ensuing detailed description taken in conjunction with the accompanying drawings.

BRIEF DESCRIPTION OF THE DRAWINGS

FIG. 2(a) is an explanatory view showing the structure of an optical pickup provided in the optical disk device;

FIG. 2(b) is a front view schematically showing a receiving section of the first photodetector;

DESCRIPTION OF THE EMBODIMENTS

[First Embodiment]

Figure 1:
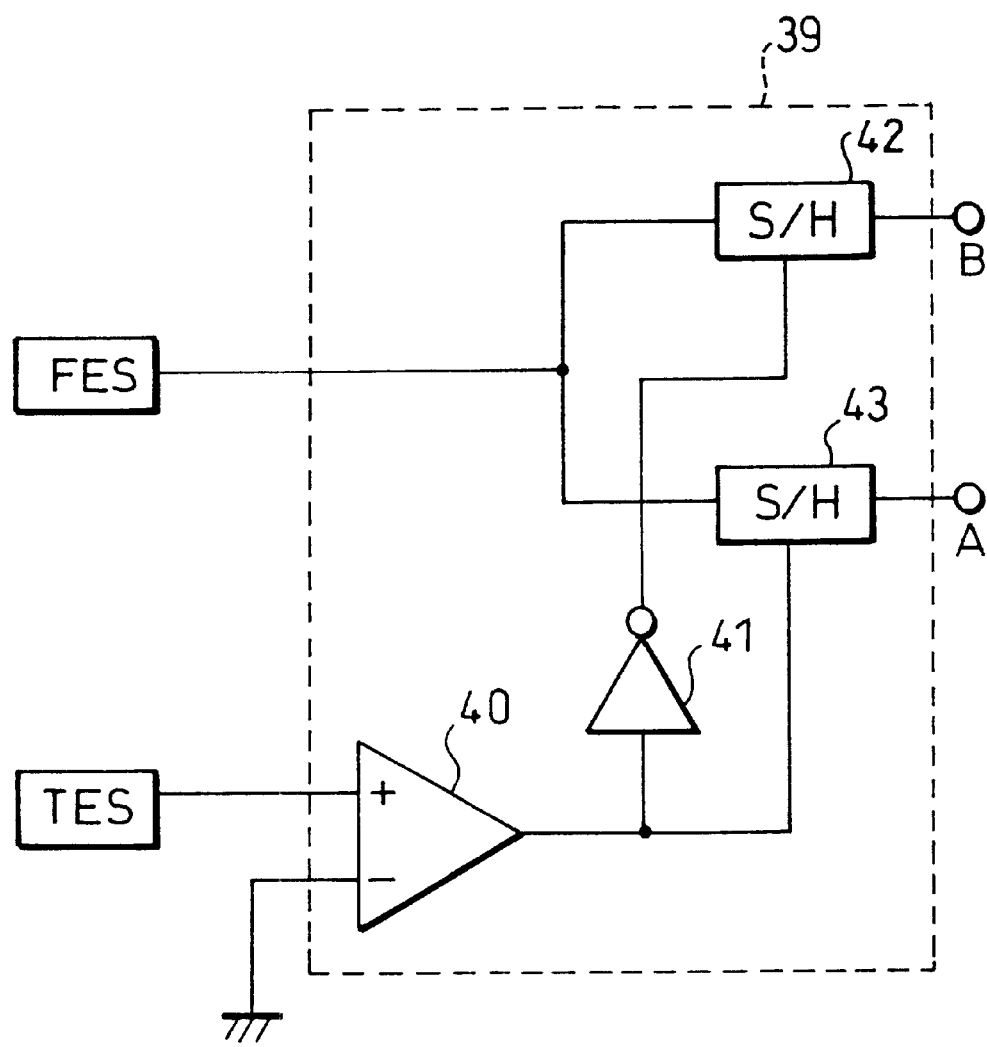
FIG. 1 is a block diagram showing a structure of a focus offset detecting circuit of an optical disk device in accordance with the first embodiment of the present invention.

The following descriptions will explain an optical disk device in accordance with one embodiment of the present invention in reference to FIG. 1 through FIG. 6.

On an optical disk designed for optical disk devices in accordance with the present embodiment for recording thereon and reproducing therefrom information, tracks (guide grooves) along which a tracking is carried out by a light spot are formed beforehand. A groove section where tracks are formed is hereinafter simply referred to as a groove section, and a region between adjoining groove sections is hereinafter referred to as a land section. The optical disk device of the present embodiment is arranged so as to record and reproduce information with respect to both the groove section and the land section.

Firstly, the structure of the optical pickup adopted in the optical disk device in accordance with the present embodiment will be explained in reference to FIG. 2(a). The explanations on the optical pickup shown in FIG. 2(a) will be given through an example designed for a magneto-optical disk utilizing the magneto-optical effects.

As shown in FIG. 2(a), a light beam emitted from the semiconductor laser 1 of the optical pickup 20 is shaped into parallel light by a collimator lens 2, and is projected onto a first beam splitter 3. The light which has passed through the first beam splitter 3 is reflected by a 45° mirror 4, and is directed to an optical disk 6 via an objective lens 5 to be focused on and reflected from the optical disk 6.

Along the described optical path in a reverse direction, the light reflected from the optical disk 6 is partially returned to the semiconductor laser 1 via the first beam splitter 3, and the rest of the reflected light is further reflected towards the second beam splitter 7 by the first beam splitter 3.

A part of the light reflected towards the second beam splitter 7 is reflected towards a first converging lens 8 at the second beam splitter 7, and the rest of the light is transmitted through a second converging lens 14. The light transmitted through the second converging lens 14 is transmitted through a cylindrical lens 15 (which is set such that its generating line and the plane of FIG. 2(a) form an angle of 45 degrees) and then converged onto a first photodetector 16 (photodetector), thereby generating servo error signals of a focus error signal and a tracking error signal.

As shown in FIG. 2(b), the first photodetector 16 includes four light receiving sections 16a, 16b, 16c and 16d. Since light received by the first photodetector 16 has been diffracted by groove sections formed on the disk surface of the optical disk 6, a diffraction pattern 17 is formed on the light receiving sections of the first photodetector 16.

In the optical pickup 20, a push-pull method is adopted as a tracking error signal detecting method. Therefore, the tracking error signal occurs due to the asymmetry of the diffraction pattern 17 generated by the positional relationship between the spot as converged on the optical disk 6 and the groove section formed on the surface of the optical disk 6. The tracking error signal can be calculated by the following equation (1):

$$TES=(Sa+Sc)-(Sb+Sd) \qquad (1),$$

wherein Sa, Sb, Sc and Sd are respective outputs from the light receiving sections 16a, 16b, 16c and 16d.

In the optical pickup 20, an astigmatism is used as the focus error signal detecting method. The focus error signal is calculated by the following equation (2):

$$FES=(Sa+Sd)-(Sb+Sc) \qquad (2).$$

In addition, the light reflected towards the first converging lens 8 in the second beam splitter 7 is converged by the first converging lens 8 and rotated 45 degrees in polarization by ½ wavelength plate 9. Thereafter, the light enters a polarizing beam splitter 10 where a part of the light is transmitted through so as to be converged on a second photodetector 11.

The rest of the light is reflected from a polarizing beam splitter 10 and is converged on a third photodetector 12.

An output of the second photodetector 11 is input to a negative terminal of a differential detector 13, and an output of the third photodetector 12 is input to a positive terminal of the differential detector 13. The difference between signals input from respective photodetectors 11 and 12 is detected as information reproducing signal utilizing the magneto-optical effects recorded on the optical disk 6.

Figure 3:
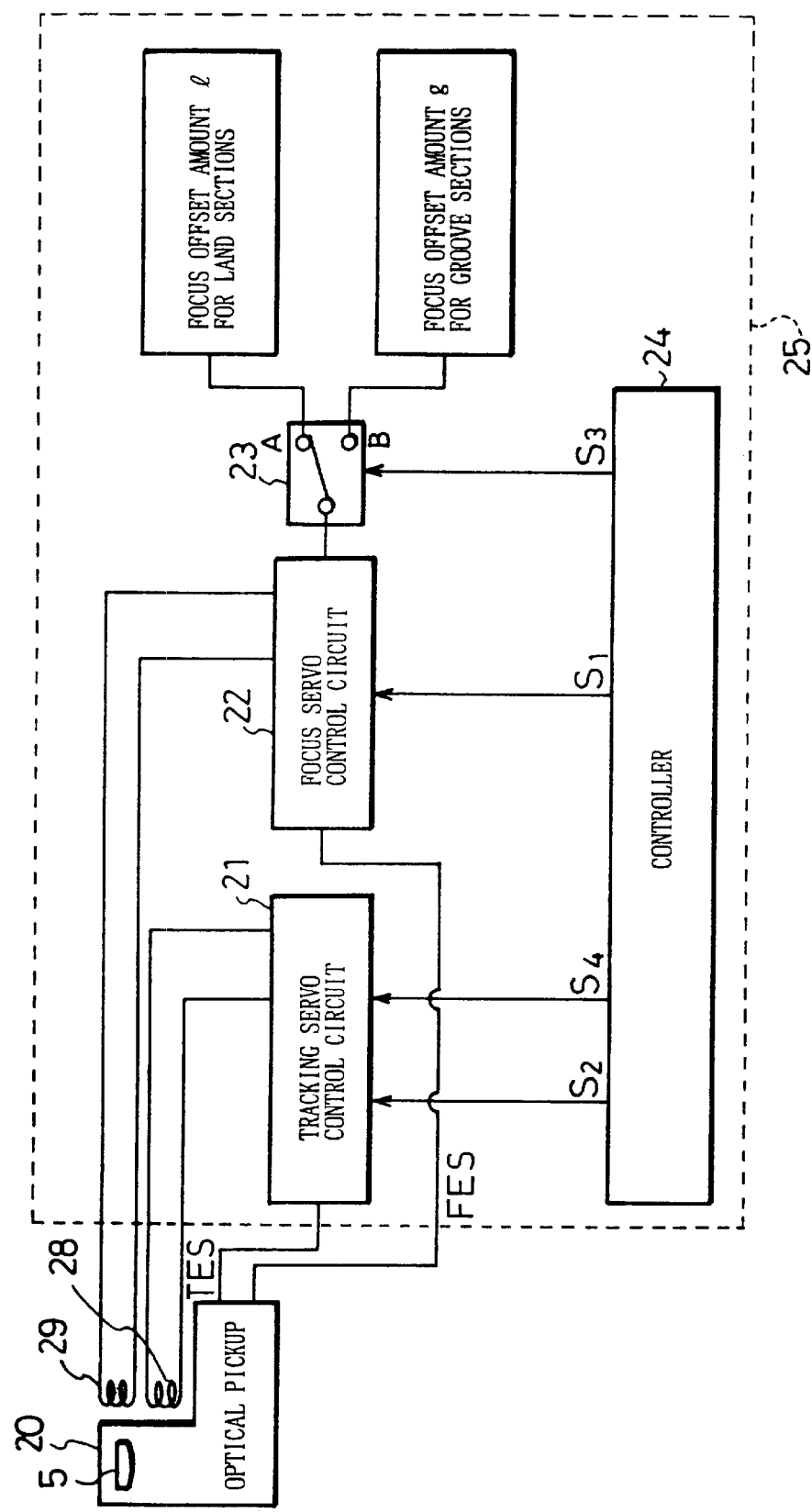
FIG. 3 is a block diagram showing a structure of a system of a servo control system.
Figure 4:
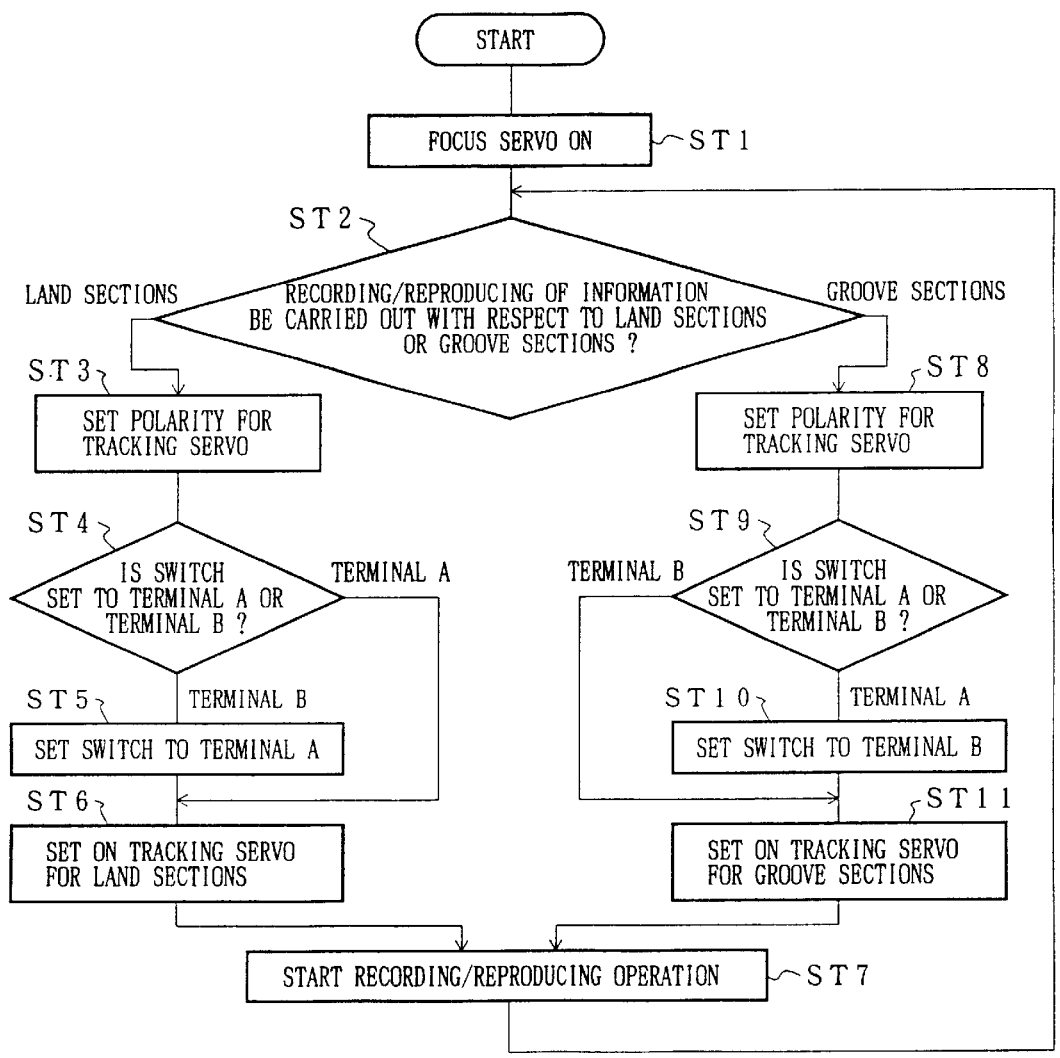
FIG. 4 is a flowchart explaining a servo control process in the servo control system.

The following description explains the servo control system of the optical information recording/reproducing device of the present embodiment and the processes of the servo control in reference to FIG. 3 and FIG. 4.

As shown in the block diagram of FIG. 3, a servo control system 25 includes a tracking servo control circuit 21, a focus servo control circuit 22 (focus error signal control means), a switch 23 (switch means) and a controller 24 (control means).

To the tracking servo control circuit 21, a tracking error signal is input from the described first photodetector 16 in the optical pickup 20 and a tracking servo polarity control signal $S_2$ and a tracking servo ON signal $S_4$ are input from the controller 24. Upon receiving the tracking servo ON signal $S_4$, the tracking servo control circuit 21 carries out a tracking servo based on the tracking error signal with the tracking servo polarity as specified by the tracking servo polarity control signal $S_2$, thereby driving the tracking actuator 28.

In the focus servo control circuit 22, the focus error signal is input from the first photodetector 16, and the focus servo on signal $S_1$ is input from the controller 24. In the focus servo control circuit 22, either a focus offset amount l (first focus offset amount) for the land sections or the focus offset amount g (second focus offset amount) for the groove sections is input via the switch 23. In the focus servo control circuit 22, upon receiving the focus servo ON signal $S_1$, the focus error signal is compensated based on the focus offset amounts l and g as input via the switch 23, and the focus servo is carried out based on the focus error signal as compensated, thereby driving a focussing actuator 29.

To the switch 23, a switching signal $S_3$ is input from the controller 24, and the switch 23 switches between the terminal A and the terminal B based on the switching signal $S_3$. In the contact terminal A of the switch 23, a focus offset amount l for the land portions as detected by the described focus offset detecting circuit 39 (offset amount detection means) is set. In the control terminal B of the switch 23, a focus offset amount g for the groove sections as detected by the focus offset detecting circuit 39 is set.

The controller 24 is arranged so as to output the focus servo ON signal $S_1$, the tracking servo polarity control signal $S_2$, the switching signal $S_3$ and a tracking servo ON signal $S_4$ to the corresponding tracking servo control circuit 21, the focus servo control circuit 11 and the switch 23 respectively, thereby controlling the driving of these members.

When carrying out a servo control, the focus servo ON signal $S_1$ from the controller 24 is input to the focus servo control circuit 22. Based on the focus servo ON signal $S_1$, the focus servo control circuit 22 is actuated. Then, the focus servo control circuit 22 compensates the focus error signal from the optical pickup 20 based on either the focus offset amount l or g for the land sections and the groove sections as input from the switch 23. As a result, the focussing actuator 29 is actuated based on the focus error signal thus compensated, thereby setting ON the focus servo (ST1 of FIG. 4).

Here, the focus offset amount used in this example may be the focus offset amount l for the land portions or the focus offset amount g for the groove sections, and the switch 23 may be set to the terminal A or the terminal B.

Thereafter, it is determined by the controller 24 whether a region to be tracked for reproduction is carried out with respect to the land sections or the groove sections (ST2). This determination is made based on the TOC information recorded in the TOC area of the optical disk 6 as read when inserting the optical disk 6 into the optical disk device.

If it is determined that a reproducing operation is carried out with respect to the land section, upon inputting the tracking servo polarity control signal $S_2$ from the controller 24, the tracking servo control circuit 21 is set such that a tracking is carried out at a zerocross point with a rising polarity to the right (ST3).

Thereafter, the determination is carried out whether the switch 23 is set to the terminal A or the terminal B (ST4). If it is determined that the switch 23 is set to the terminal A, since the focus servo is carried out based on the focus offset amount l for the land sections, the switch 23 cannot be switched. In this state, the objective lens 5 of the optical pickup 20 has already set at an optimal focal position.

On the other hand, if it is determined in S4 that the switch 23 is set to the terminal B, the switch signal $S_3$ is output from the controller 24, and the switch 23 is switched to the terminal A (ST5). As a result, a focus servo is carried out based on the focus offset amount l for the land sections, and the objective lens 5 of the optical pickup 20 is located at an optimal focal position. Here, with variable focus offset amount, a distance between the objective lens 5 and the optical disk 6 varies. However, since the variation in the distance is in the micron order, the focus servo would not be affected by the switching.

Thereafter, the tracking servo ON signal $S_4$ from the controller 24 is input to the tracking servo control circuit 21, thereby activating the tracking servo control circuit 21. Based on the tracking error signal from the first photodetector 16, the tracking actuator 28 is driven so as to set ON the tracking servo (ST6), thereby starting an operation of recording/reproducing information (ST7).

On the other hand, if it is determined in S2 that the tracking region is the groove section, based on the tracking servo polarity control signal $S_2$ from the controller 24, the tracking servo control circuit 21 is set so that a tracking is carried out at a zerocross point with a rising polarity to the right (ST8).

Thereafter, it is determined if the switch 23 is set to the terminal A or the terminal B (ST9). If it is determined that the switch is set to the terminal B, the focus offset amount g for the groove sections is already set without switching the switch 23, and the objective lens 5 of the optical pickup 20 is already located at an optimal focal position.

On the other hand, if it is determined in S9 that the switch 23 is switched to the terminal A, the switch 23 is switched to the terminal B (ST10). Then, the focus offset amount is set to the focus offset amount g for the groove sections. As a result, the objective lens 5 of the optical pickup 20 can be positioned at an optimal focal position.

Thereafter, in the same manner as in S6, the tracking servo is set ON (ST11), and the recording and reproducing of information are started (ST7).

The structure of the focus error signal generating system for compensating the focus error signal based on the respective focus offset amount l or g for the land section and the groove section will be explained in reference to FIG. 5(a).

As described, in the optical pickup 20 of the optical disk device, since the astigmatism is used as a method of detecting the focus error signal, the focus error signal is obtained by the aforementioned equation (2).

Figure 5A:
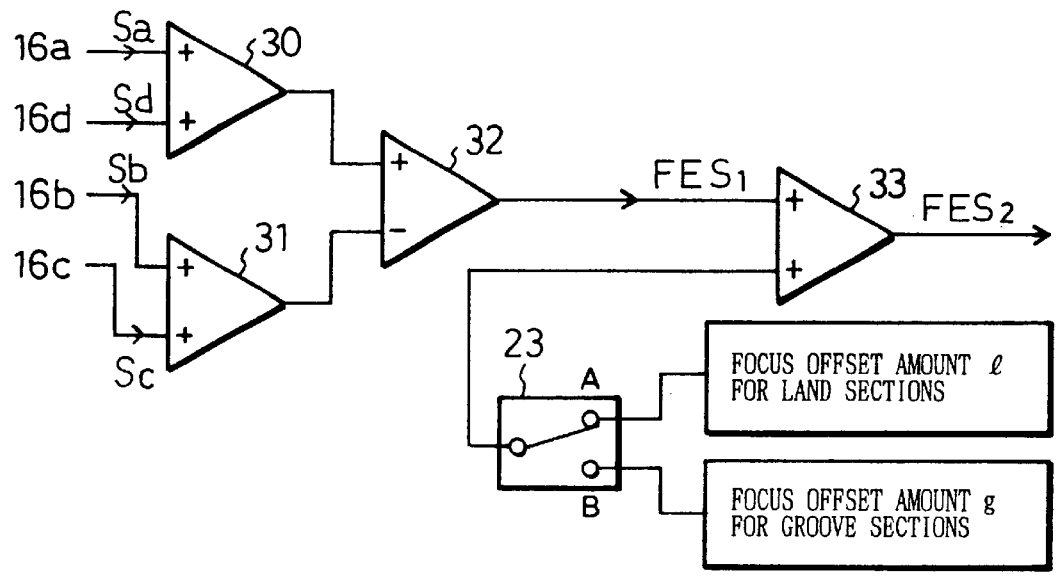
FIG. 5(a) is a block diagram showing focus error signal generating system.

As shown in FIG. 5(a), a circuit is arranged such that a sum of the outputs (Sa+Sd) of the light receiving section 16a and the light receiving section 16d is formed by a summing amplifier 30, and a sum of the outputs (Sb+Sc) of the light receiving section 16b and the light receiving section 16c is formed by the summing amplifier 31. Then, a difference in outputs between the summing amplifier 30 and the addition amplifier 31 is computed by the differential amplifier 32.

To the resulting focus error signal (hereinafter referred to as a focus error signal$_1$ to be distinguished from the compensated focus error signal to be described later), the respective focus offset amounts l and g are added by the following additional amplifier 33. Upon selecting the focus offset amount X (l or g) by the switch 23 for the land section or the groove section, the compensated FES$_2$ is calculated by the following equation (3):

$$FES_2=(Sa+Sd)-(Sb+Sc)+X \qquad (3).$$

Here, the focus offset amount X for the land sections is the focus offset amount l (negative), and the focus offset amount g for the groove sections (positive).

The first photodetector 16 provided in the optical pickup 20 shown in FIG. 2(a) and the focus servo control circuit 22 shown in FIG. 3 have the functions of the focus error signal generating system.

Figure 6:
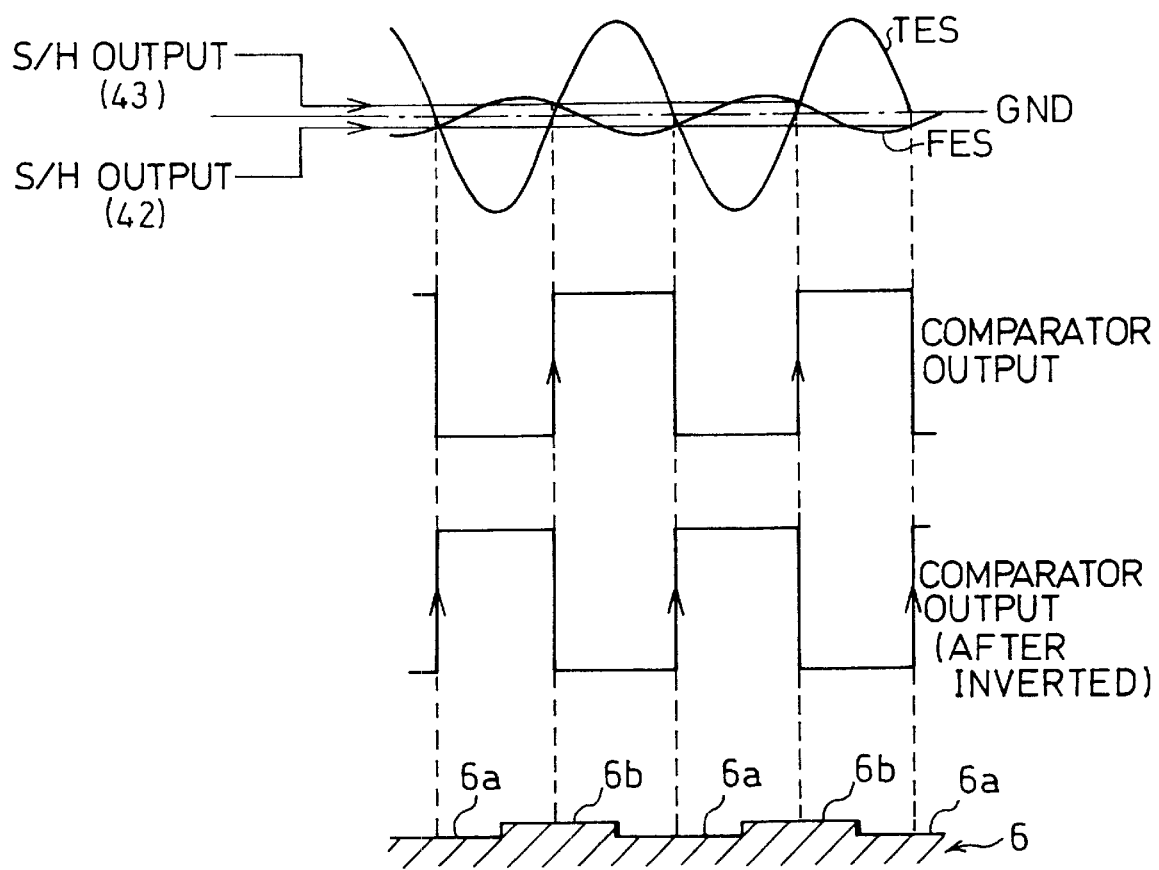
FIG. 6 is an explanatory view showing a waveform of an output signal in each section of the focus offset detecting circuit shown in FIG. 1.

Next, the structure of the focus offset detecting circuit for detecting the focus offset amount will be explained in reference to FIG. 1 and FIG. 6.

As shown in FIG. 1, a focus offset amount detecting circuit 39 (offset amount detection means) includes a comparator 40, an inverter circuit 41 and two sample hold circuits 42 and 43 (sampling means).

To the comparator 40, the tracking error signal represented by the equation (1) is input, and the output of the comparator 40 is branched into the one which is to be input to the sample hold circuit 43 directly, and the one which is to be input to the sample hold circuit 42 after reversing the polarity by the inverter circuit 41.

Then, in the sample hold circuits 42 and 43, the focus error signal (FES$_1$) defined by the equation (2) is divided and input respectively. The output of the sample hold circuit 42 is connected to the contact terminal B of the switch 23 in the servo control system shown in FIG. 3. On the other hand, the output from the sample hold circuit 43 is connected to the contact terminal A of the switch 23.

The output signal resulting from respective sections of the focus offset amount detecting circuit 39 will be explained in reference to FIG. 6. FIG. 6 shows the outputs of the servo error signals of both the focus error signal and the tracking error signal from the optical pickup 20, the output of the comparator 40, the signal waveform of the output from the inverter circuit 41. The focus error signal indicates a servo error signal in the state where only the focus servo is set ON. The respective servo error signals correspond to the respective positions (groove sections 6a and land sections 6b) of the optical disk 6 where the spot as converged on the optical disk 6 by the objective lens 5 are formed.

The signal resulting from the comparator 40 becomes an output corresponding to a rise or fall of the tracking error signal. As shown in FIG. 6, the signal is set to a High level at the center of the land section 6b, and is switched to a low level at a center of the groove section 6a. On the other hand, the signal resulting from the comparator 40 is reversed by the inverter circuit 41. As shown in FIG. 6, the signal is set to a Low level at the center of the land portion, and is switched to a High level at a center of the groove section 6a.

The respective outputs from the comparator 40 are connected to the sample hold circuits 42 and 43 to which the focus error signal is connected. In the sample hold circuits 42 and 43, the data at the rise of the comparator output are held in their memories. Therefore, in the sample hold circuit 42, the focus offset amount g at the center of the groove 6a is stored in the memory, and in the sample hold circuit 43, the focus offset amount l at the center of the land 6b is stored in the memory.

Then, the focus offset amounts l and g as stored in the memories of the respective sample hold circuits 42 and 43 are respectively output to the contact terminal A and the contact terminal B of the switch 23 shown in FIG. 3. Then, the focus offset amount l for the land sections is set to the contact terminal A, and the focus offset amount g for the groove sections is set to the contact terminal B.

In the optical disk device, the described detection of the focus offset amount is carried out in the ON state of the focus servo so as to read the TOC data from the TOC area when activating the device and the optical disk 6 is inserted into the optical disk device.

Generally, the optical disk device carries out a recording/reproducing operation in the order of inserting a disk→focus servo ON→tracking servo ON→recording/reproducing of information. However, as described above, a detection of a focus offset amount is carried out at a time the focus servo is set ON so as to read out the TOC data, a problem arises in that a long time is required for starting up the device.

As described, in the optical disk device, respective focus offset amounts l and g for the land sections and the groove sections for use in switching of the focus servo control amount for the land sections and the groove sections are detected by the following manner. That is, in the state where only the focus servo is set ON, a signal which rises at respective centers of a land section and a groove section is prepared, and the focus error signal is sampled at a rise of the signal, thereby detecting the respective focus offset amounts l and g.

Therefore, the detection of the focus offset amounts l and g of the land section and the groove section can be fully experienced within the normal starting time. According to the described arrangement, each time an optical disk is installed, the respective focus offset amounts l and g are detected, and the respective focus offset amounts l and g are detected, and the focus error signal is computed based on the focus offset amount l or g as detected. Therefore, the problems associated with the conventional arrangement that the focus offset amounts are set based on the crosstalk between error signals at a time of assembling the optical pickup using the conventional reference signal, effects of an error due to variations over time and variations between the optical disks can be avoided.

In the present embodiment, in order to obtain an optimal focus servo control amount, the focus offset amount is compensated based on the focus error signal. However, for example, as described below, by controlling the electric amplifier ratio (gain balance) of each light receiving section of the first photodetector 16, the same focus servo as described above can be obtained.

Figure 5B:
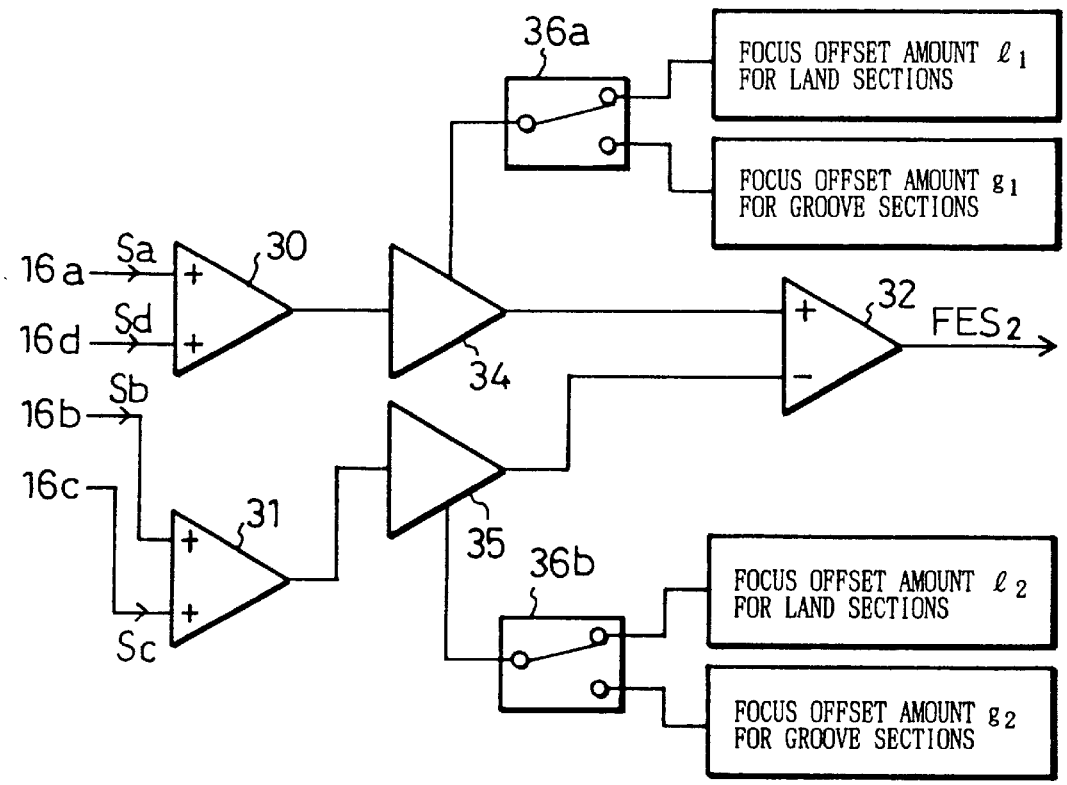
FIG. 5(b) is a block diagram showing another structure of a focus error signal generating system.

As shown in FIG. 5(b), the focus error signal generating system is constituted by the additional amplifiers 30, 31, amplifiers 34 and 35, and the differential amplifier 32. The amplification factor of the amplifier 34 is $F_1$, and the amplification factor of the amplifier 35 is $F_2$.

According to the described arrangement, a sum (Sa+Sd) of respective outputs from the light receiving sections 16a and 16d of the first photodetector 16 is obtained by an additional amplifier 30, and a sum (Sb+Sc) of respective outputs from the light receiving sections 16b and 16c is obtained by the additional amplifier 31. The signals formed by the additional amplifiers 30 and 31 are amplified by the amplifiers 34 and 35.

By the switch 36a, either the focus gain amount $l_1$ for the land sections or the focus gain amount $g_1$ for the groove sections is selected to be input to the amplifier 34, where the signal is amplified by $F_1$. Similarly, by the switch 36b, either the focus gain amount $l_2$ for the land sections or the focus gain amount $g_2$ for the groove sections is selected to be input to the amplifier 34, where the signal is amplified by $F_2$.

Thereafter, a difference in outputs between the amplifiers 34 and 35 is calculated by the differential amplifier 32, and the $FES_2$ represented by the following equation (4) is obtained.

$$FES_2 = F_1(Sa+Sd) - F_2(Sb+Sc) \quad (4).$$

The above equation (4) can be rearranged to the equation (5).

$$FES_2 = (Sa+Sd) - (Sb+Sc) + \alpha\alpha^* = (F_1-1) \times (Sa+Sd) - (F_2-1) \times (Sb+Sc) \quad (5).$$

By setting the value $\alpha$ shown in the equation (5) to be equivalent to the focus offset amount X in the equation (3), the compensated FES with the focus offset amount can be set equivalent to the compensated FES as compensated based on the gain balance. Therefore, by altering the gain balance of the output from the receiving section of the first photodetector 16 for use in generating the servo signal, an optimal focus servo control can be carried out as in the case of compensating the focus error signal based on the focus offset amount.

As described, an optical information recording/reproducing device of the present invention for recording/reproducing information by converging light on an optical medium including land sections 6b and groove sections 6a and detecting a light reflected therefrom using an optical pickup may be arranged so as to include: a focus offset amount detecting circuit 39 serving as offset amount detection means for detecting a focus offset amount based on variations in amount of a focus error signal at a time a light beam crosses a boundary between a land section 6b and a groove section 6a adjacent to the land section 6b, and a focus servo control circuit 22 serving as focus error signal compensation means for obtaining respective optimal focal positions for the land sections 6b and the groove sections 6a by compensating the focus error signal based on the focus offset amount as detected by the focus offset amount detecting circuit 39.

In the described arrangement, it may be further arranged such that the focus offset amount detecting circuit 39 serving as offset amount detection means detects variations in amount of the focus error signal at a center of each land section 6b at a time the light spot passes the boundary between the land section 6b and the groove section 6a adjacent to the land section 6b as a focus offset amount for the land sections 6b.

In the described arrangement, it may be also arranged such that the focus offset amount detecting circuit 39 serving as offset amount detection means detects variations in amount of the focus error signal at a center of each groove section at a time the light spot passes the boundary between the land section 6b and the groove section 6a adjacent to the land section 6b as a focus offset amount for the groove sections 6a.

In the described arrangement, it is preferable that the focus offset amount detecting circuit 39 serving as offset amount detection means includes a comparator 40 for inputting thereto a tracking error signal at a time the light spot crosses a boundary between the land section 6b and the groove section 6a adjacent to the land section 6b; and sample hold circuits 42 and 43 serving as sampling means for sampling the focus error signal in an ON state of a focus servo based on an output from the comparator 40.

It may be further arranged such that the comparator 40 outputs a signal whose level varies at a center of each land section 6n as a result of comparison with a predetermined reference level, and the sample hold circuits 42 and 43 serving as sampling means sample a focus error signal when varying an output signal from the comparator 40.

It may be further arranged such that the comparator 40 outputs a signal whose level varies at a center of each groove section 6a as a result of comparison with a predetermined reference level, and the sample hold circuits 42 and 43 serving as sampling means samples a focus error signal when varying an output signal from the comparator 40.

It may be also arranged such that the focus offset amount detecting circuit 39 detects an amount of the focus offset at a start of a focus servo for reading out initial data, which is to be carried out when inserting the optical disk into the device.

The described information recording/reproducing device of the present invention may be arranged so as to further include: a plurality of light receiving sections 16a, 16b, 16c and 16d for receiving light reflected from the optical disk for generating the focus offset signal, wherein the focus servo control circuit 22 compensates a focus error signal by controlling an electric amplifier ratio of an output from each light receiving section based on the focus offset amount.

The present invention can be suitably applied to an optical information recording/reproducing device for recording/reproducing information using a light beam with respect to both groove sections and land sections of an optical disk, which includes:

a focus offset amount detecting circuit 39 for detecting a focus offset amount based on variations in amount of a focus error signal at a time a light beam crosses a boundary between a land section 6b and a groove section 6a adjacent to the land section 6b, and a focus servo control circuit 22 for obtaining respective optimal focal positions for the land section 6b and the groove section 6a by compensating the focus error signal based on the focus offset amount as detected by the focus offset amount detecting circuit 39.

This arrangement may be further arranged such that the focus offset amount detecting circuit 39 detects a focus offset amount l for the land sections 6b and a focus offset amount g for the groove sections 6a, and the focus servo control circuit 22 includes a switch 23 for switching between the focus offset amount l and the focus offset amount g, and a controller 24 for controlling a switching operation of the switch 23 depending on whether the tracking position of a light spot is a land section 6b or a groove section 6a.

[Second Embodiment]

An optical disk device in accordance with the second embodiment of the present invention will be explained in reference to FIG. 7 and FIG. 8. For convenience in explanations, members having the same functions as the aforementioned embodiment will be designated by the same reference numerals, and the descriptions thereof shall be omitted here.

In the optical disk device of the present invention, detections of respective focus offset amounts l and g for the land sections and the groove sections are carried out by a different method from the method adopted in the first embodiment. Other than that, the optical disk device in accordance with the present embodiment has the same structure as that of the first embodiment.

The structure of a focus offset amount detecting circuit 55 (offset amount detection means) of the focus offset mounts l and g for the land sections and the groove sections will be explained in reference to FIG. 7 and FIG. 8.

Figure 7:
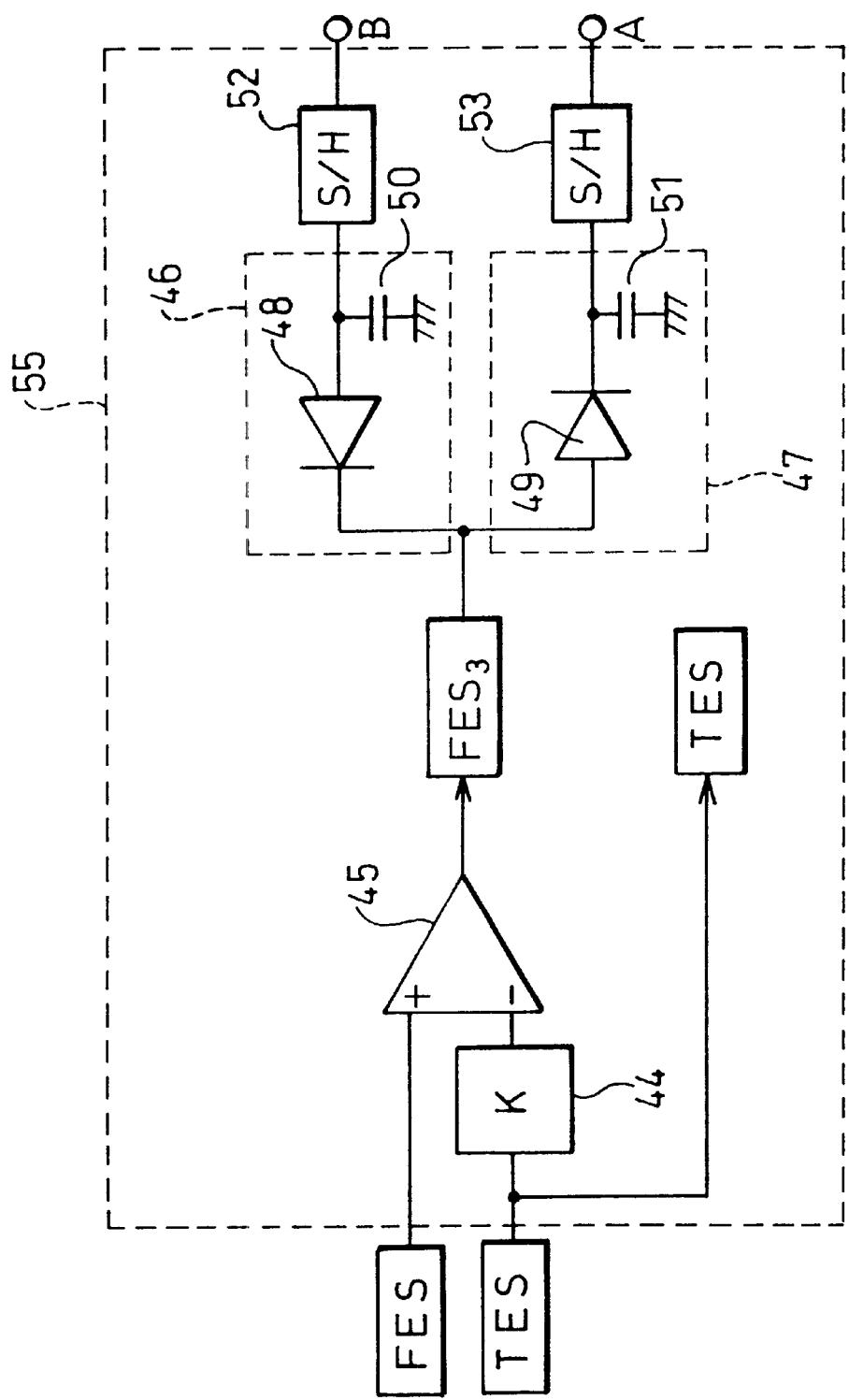
FIG. 7 is a block diagram showing a structure of a focus offset amount detecting circuit of an optical disk device in accordance with the second embodiment of the present invention.

As shown in FIG. 7, the focus offset amount detecting circuit 55 is composed of an amplifier 44 (second signal generation means, difference signal generation means), a difference detector 45 (second signal generation means, difference signal generation means), envelope detectors 46 and 47, and two sample hold circuits 52 and 53.

To the positive terminal of the difference detector 45, the focus error signal shown by the equation (2) is input. To the negative terminal, the tracking error signal of the amplifier 44 shown by the equation (1) as multiplied by k is input. The difference detector 45 carries out a difference detection with respect to an output $FES_3$ (second signal) shown by the equation (6). The described amplifier 44 and the difference detection 45 constitute the second signal generation means and the difference signal generation means of the present invention.

$$FES_3 = FES - k \cdot TES \qquad (6).$$

The output $FES_3$ of the difference detection 45 is divided into two to be input to the envelope detectors 46 and 47 respectively. The envelope detectors 46 and 47 are composed of the diodes 48 and 49 and the condensers 50 and 51 respectively, and by detecting the peak and the bottom of the input $FES_3$, respective sample hold circuits 52 and 53 are stored in the memory.

The output of the sample hold circuit 52 is connected to the contact terminal B of the switch 23 in the servo control system shown in FIG. 3, and the output of the sample hold circuit 53 is connected to the contact terminal A of the switch 23.

In the structure shown in FIG. 7, the resulting output signal will be explained in reference to FIG. 8.

Figure 8:
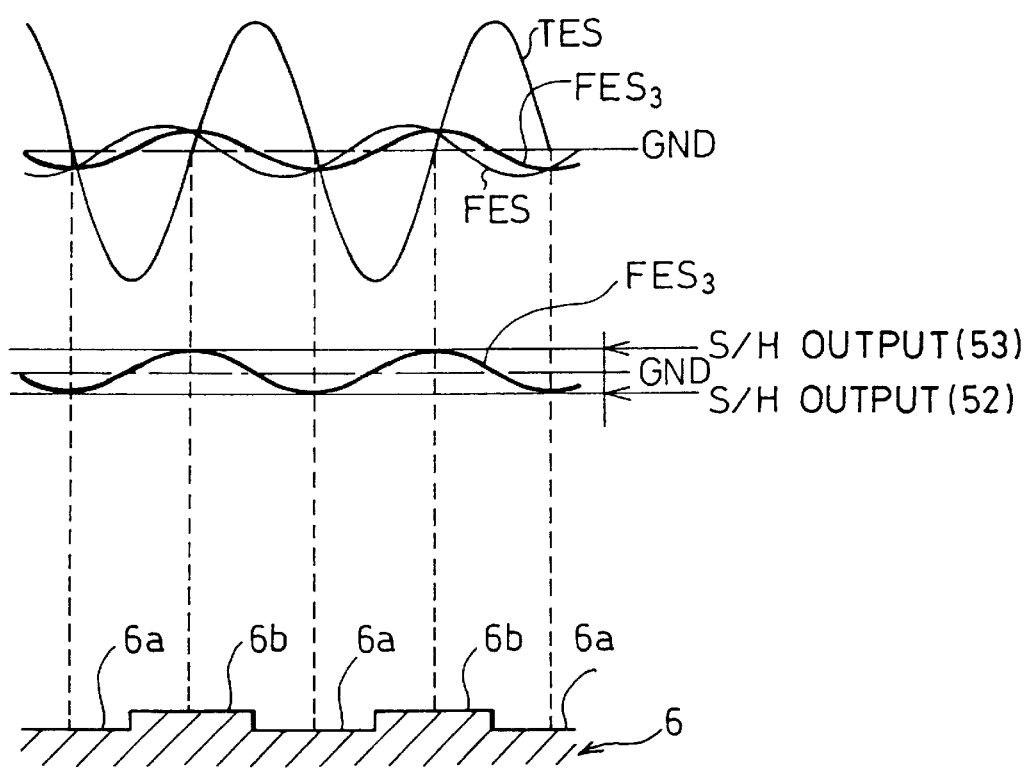
FIG. 8 is an explanatory view showing a wavelength of an output signal in each section of the focus offset detecting circuit of FIG. 7.

FIG. 8 shows each waveform of an output signal in each section of the focus offset detecting circuit 55, and shows the servo error signal in the state where the focus servo is set ON. Here, the respective servo error signals correspond to respective sections (groove section 6a and land section 6b) of the optical disk 6 shown in the figure where the light spots are converged on the optical disk 6 by the objective lens 5.

The difference output $FES_3$ between the focus error signal and tracking error signal obtained by the equation (6) will be explained.

Assumed that the tracking error signal be a sinewave, then, the tracking error signal is shown by the following equation (7):

$$TES = A \cdot \sin\{2\pi \cdot (x/P)\} \qquad (7),$$

wherein x is a position where a spot is formed as being converged on the optical disk 6 by the objective lens 5, and P is a track pitch of the optical disk 6, A: tracking error signal amplitude.

On the other hand, assuming that the phase difference between the focus error signal and the tracking error signal is θ, then the focus error signal can be shown by the following equation (8), $$FES = B \cdot \sin\{2\pi \cdot (x/P) + \theta\} \qquad (8).$$

B: amplitude of a crosstalk between error signals.

The focus error signal shown by the equation (8) is shown by the following equation (9).

$$FES = B \cdot \sin\{2\pi \cdot (x/P) + \theta\} = B \cdot \sin\{2\pi(x/P)\} \cdot \cos\{2\pi \cdot \theta\} + B \cdot \cos\{2\pi \cdot (x/P)\} \cdot \sin\{2\pi\} \qquad (9).$$

In the equation (9), as the phase difference θ between the focus error signal and the tracking error signal can be considered as a constant, assuming that $$B \cdot \cos\{2\pi \cdot \theta\} = C,$$

and $$B \cdot \sin\{2\pi \cdot \theta\} = D,$$

then, the equation (9) can be rewritten into the following equation (10):

$$FES = C \cdot \sin\{2\pi \cdot (x/P)\} + D \cdot \cos\{2\pi \cdot (x/P)\} \qquad (10).$$

Assumed the amplifier k of the amplifier 44 shown in FIG. 7 be k=C/A, then the $FES_3$ is shown by the following equation (1).

Assuming the amplifier k of the amplifier 44 shown in FIG. 7 is k=C/A, then the $FES_3$ is shown by the following equation (11).

$$\begin{aligned} FES_3 &= FES - k \cdot TES \qquad (11) \\ &= C \cdot \sin\{2\pi \cdot (x/P)\} + D \cdot \cos\{2\pi \cdot (x/P)\} - \\ &\quad (C/A) \cdot A \cdot \sin\{2\pi \cdot (x/P)\} \\ &= C \cdot \sin\{2\pi \cdot (x/P)\} + D \cdot \cos\{2\pi \cdot (x/P)\} - \\ &\quad C \cdot \sin\{2\pi \cdot (x/P)\} \\ &= D \cdot \cos\{2\pi \cdot (x/P)\} \\ &= D \cdot \sin\{\pi/2 - 2\pi \cdot (x/P)\} \\ &= -D \cdot \sin\{2\pi \cdot (x/P) - \pi/2\}. \end{aligned}$$

The $FES_3$ shown by the equation (11) is a signal deviated by π/2 (90°) with respect to the tracking error signal, and at the point where the tracking error signal (TES) is 0, the $FES_3$ shows a peak or bottom value.

The above relationship will be explained in reference to FIG. 8. In FIG. 8, the tracking error signal and the focus error signal become signals whose phases are deviated by θ. On the other hand, the tracking error signal (TES) and the $FES_3$ become signals whose phases are deviated by 90°. At the center of the land section 6a, the tracking error signal (TES) becomes 0, and the $FES_3$ becomes bottom.

As shown in FIG. 8, the respective outputs of the envelope detectors 46 and 47 shown in FIG. 7 show peak values at the center of the land section 6b, and shows a bottom value at the center of the groove section 6a. These values are stored in the sample hold circuits 52 and 53. Specifically, in the sample hold circuit 52, the focus offset amount g at the center of the groove section 6a is stored. On the other hand, in the sample hold circuit 53, the focus offset amount l at the center of the land portion 6b is stored.

The respective focus offset amounts l and g of respective sample hold circuits 52 and 53 are output to the contact terminal A and the contact terminal B of the switch 23 shown in FIG. 3. Then, the focus offset amount l for the land sections is set to the contact terminal A, and the focus offset amount g for the groove sections is set to the contact terminal B. According to the described arrangement, as achieved from the optical disk device in accordance with the first embodiment, an optimal focus servo control can be performed according to the groove sections and the land sections.

As to the relationship between the phase of the tracking error signal and the phase of the focus error signal, the focus error signal deviates (crosstalk between error signals) due to asymmetry of light reflected from the disk on the first photodetector 16 generated by the aberration of the optical components of the optical pickup 20, particularly the objective lens 5, and the focus error signal has a phase difference from the tracking error signal of around 90°. On the other hand, the focus error signal deviates due to the positioning inferior of the first photodetector 16, etc., in phase with or in reverse phase with the tracking error signal. Namely, when adopting the structure shown in FIG. 7, problems associated with the positioning inferior of the first photodetector 16, etc., can be eliminated by adopting $FES_3$ as a focus error signal.

In the described preferred arrangement, the problems associated with the positioning inferior are eliminated by detecting the peak and the bottom of the difference signal $FES_3$. However, in the case where only the effects of the crosstalk between the error signals be considered, the arrangement which permits the detection of the peak and the bottom of the focus error signal would offer sufficient effects.

As described, the focus offset amount detecting circuit 55 of the present invention may be arranged so as to include envelope detectors 46 and 47 for detecting an envelope of a focus error signal in the ON state of a focus servo at a time a light spot passes a boundary between a land section 6b and a groove section adjacent to the land section.

It may be arranged such that the focus offset amount detecting circuit 55 includes an amplifier 44 serving as the second signal generation means for generating $FES_3$ (a second signal) of the focus error signal which has a phase difference from a tracking error signal of 90°, the second signal showing respective peak values at a center of each land section 6b and a center of each groove section 6a in the ON state of the focus servo at a time the light spot crosses the boundary between the land section 6b and the groove section 6a, wherein the second signal is input to the envelope detectors 46 and 47.

The above arrangement may be further arranged such that the second signal generation means is composed of a difference detector 45 for subtracting tracking error signals multiplied by k from a focus error signal in the ON state of the focus servo at a time the light spot crosses the boundary between the land section 6b and the groove section 6a, wherein k is obtained by the following equation:

$$k=\{B\cdot\cos(2\pi\cdot\theta)\}/A,$$

wherein A is an amplitude of a tracking error signal, B is an amplitude of a focus error signal in the ON state of the focus servo when the light spot passes the boundary between the land section 6b and the θ section 6a adjacent to the land section 6b, and l is a phase difference between the focus error signal and the tracking error signal.

[Third Embodiment]

Figure 9:
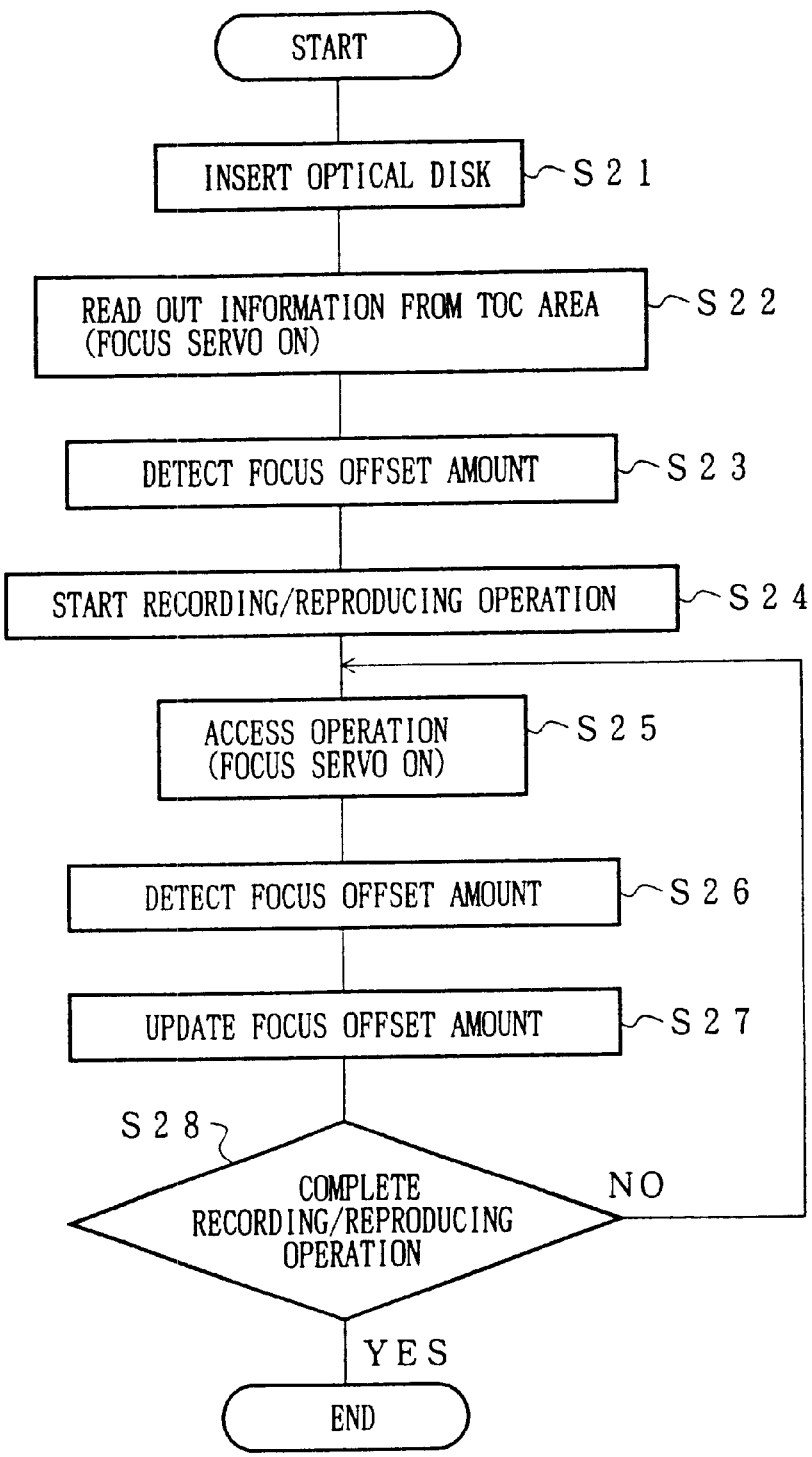
FIG. 9 is a flowchart showing a detection timing of a focus offset amount of the optical disk device in accordance with the third embodiment of the present invention.
Figure 10:
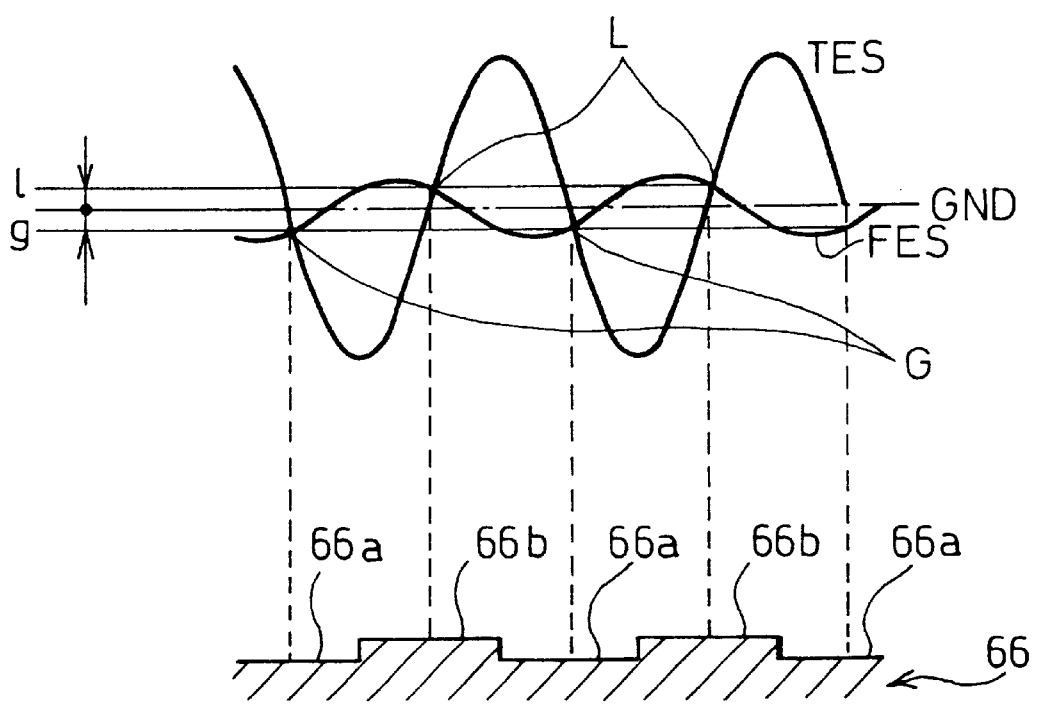
FIG. 10 is an explanatory view showing the reason why a difference in focus offset amount occurs between the land sections and the groove sections.

The following descriptions will explain an optical disk device in accordance with a still another embodiment of the present invention in reference to FIG. 9. For conveniences in explanations, members having the same function as the aforementioned embodiments will be designated by the same reference numerals, and thus the descriptions thereof shall be omitted here.

According to the optical disk devices in accordance with the first and second embodiments, the focus offset amount is detected in the following manner. That is, if there exists an eccentricity in the track, only a focus servo is set ON, and a focus offset amount is detected based on the zero cross timing of a track error signal when the light spot crosses the track.

According to the described method adopted in the first and second embodiments, in the state where the track eccentricity is small, and the track cross frequency $f_{TC}$ generated due to the eccentricity is smaller than the frequency band $f_F$ of the focus servo, the focus servo would follow. As a result, the tracking error signal does not zero-cross (cross the ground), and thus the focus offset cannot be detected.

In order to counteract the described problem, the optical disk device in accordance with the present invention is arranged such that by purposely moving the objective lens 5 in the radial direction, the zero cross point of the tracking error signal is obtained to permit the detection of a focus offset. Here, the movement of the objective lens 5 in the radial direction is carried out together with the access operation (changing a recording/reproducing position on the disk). According to the described arrangement, as the detection of the focus offset amount is carried out when carrying out the access operation, the problem of increasing the access time can be eliminated.

Moreover, as shown in the flowchart of FIG. 9, according to the optical disk device of the present embodiment, even if there exits an eccentricity of an optical disk 6, a focus offset amount can be detected upon setting ON the focus servo after inserting the disk, and thereafter, a focus offset amount is updated for each access operation.

Specifically, when the optical disk 6 is inserted in the optical disk device (S21), first, the TOC data is read (S22). Here, upon setting ON the focus servo, the respective focus offset amounts l and g for the land sections and the groove sections are detected (S23). Then, upon starting the recording/reproducing of information (S24), an access operation is executed for moving the optical pickup 20 in a radial direction in the area in which a recording/reproducing operation of information is carried out (S25). Here, upon setting ON the focus servo, the respective focus offset amounts l and g for the land sections and the groove sections are detected again, and the focus offset amount is updated (S26 and S27). Thereafter, processes in S25 through S28 are repeated until a recording/reproducing operation is completed.

According to the described process, even if there exists no eccentricity of the track, and the focus offset amount cannot be detected in S23, the focus offset amount can be surely detected in S26. Moreover, since an optimal focus offset amount can be always detected, a recording/reproducing operation of an improved signal can be performed.

The explanations of the described preferred embodiments have been given through the case of optical disk devices of performing recording/reproducing operation of information with respect to both land sections and the groove sections; however, the present invention is also applicable to the conventional arrangement of recording/reproducing information with respect to only either one of the land sections or the groove sections whichever are wider.

Namely, for example, according to the optical disk device for recording/reproducing information with respect to only the groove sections of the optical disk, the focus offset amount for only the groove sections, i.e., the output of the terminal B shown in FIGS. 1, 3, 5 and 7 is needed. On the other hand, for the optical disk device for recording/reproducing information with respect to only the land sections of the optical disk, only the focus offset amount for only the groove sections, i.e., the output of the terminal A shown in FIGS. 1, 3, 5 and 7 is needed.

In any of the described preferred embodiments, a tracking error signal is detected by a push-pull method, and a focus error signal (FES, $FES_1$) is detected by an astigmatism method. However, the present invention is not limited to these detection methods, and other known servo signal detection method, for example, 3-beam method and a knife edge method for detecting the tracking error signal and the focus error signal respectively may be adopted. Where these methods are used, the same effects as achieved from the structures of the described preferred embodiments can be achieved where groove sections and the land sections are respectively tracked, the focus servo control is optimized to obtain the most suitable focal position.

In each of the preferred embodiments of the present invention, the optical disk 6 that utilizes a known magneto-optical effect is adopted as an optical disk for recording thereon and reproducing therefrom information. However, it is contemplated that optical disks that utilize other known signal reproducing principles, such as "phase-change" effects, can also be used in accordance with the present invention, and the same effect can be achieved.

As described, the optical information recording/reproducing device of the present invention may be arranged so as to include control means for moving the converging means in a direction of crossing a boundary between the land section and the groove section by means of drive means for driving the converging means for use in servo control provided in the optical pickup.

It may be also arranged so as to include control means for moving the optical pickup in a direction of crossing a boundary between the land section and the groove section by means of the drive means for use in an access operation of the optical pickup.

As described, an optical information recording/reproducing device of the present invention for recording/reproducing with respect to at least either land sections or groove sections by converging light on a recording medium including the land sections and the groove sections and detecting light reflected therefrom using an optical pickup such as a light source, converging means, an optical detector, etc., which is provided with compensation means for compensating a focus error signal to obtain an optimal focal position, is characterized by including offset amount detection means for detecting a focus offset amount based on variations in amount of a focus error signal obtained at a time a light spot crosses a boundary between a land section and the groove section adjacent to the land section, wherein the compensation means compensates a focus error signal based on a focus offset amount detected by the offset amount detection means.

According to the described arrangement, the offset amount detection means detects a focus offset amount based on variations in amount of a focus error signal obtained at a time a light spot crosses a boundary between the land section and the groove section adjacent to the land section. The focus error signal in the ON state of the focus servo varies as being affected by the crosstalk between error signals, and thus respective focus offset amounts of the land sections and the groove sections can be detected based on variations in amount of the focus error signal. Namely, in the state where there exits an eccentricity of the tracks formed by the land sections and the groove sections on the optical disk, only the focus servo is set ON, and respective focus offset amounts can be detected at a zero-cross timing of the tracking error signal obtained at a time the light spot crosses the track.

Based on the focus offset amount as detected by the offset amount detection means, the compensation means compensates a focus error signal. Therefore, recording and reproducing of information can be carried out in an optimal focal position at just-in-focus with respect to both the land sections and the groove sections, thereby obtaining a quality reproducing signal.

Since the described detection of the focus offset amount can be carried out without difficulties within the normal time required for starting up the device, the problems associated with the conventional device that a cost of the device increases, or a longer time is required to start up the device can be eliminated. Additionally, since a focus error signal can be compensated by detecting a focus offset amount for each optical disk, unlike the conventional arrangement of setting the focus offset amount based on the crosstalk between error signals obtained at a time of assembling an optical pickup using a reference disk, problems caused by errors due to variations over time and variations of optical disks can be avoided.

The described optical recording/reproducing device may be further arranged such that the offset amount detection means detects an amount of variation of the focus error signal at a center of each land section at a time the light spot crosses a boundary between the land section and the groove section adjacent to the land section as a focus offset amount for the land sections.

According to the described arrangement, an amount of variation of the focus error signal at the center of the land section at a time the light spot crosses the boundary between the land section and the groove section adjacent to the land section can be detected as a focus offset amount for the land sections, whereby an optimal focus offset amount for tracking the land sections can be detected with accuracy.

The described optical recording/reproducing device may be further arranged such that the offset amount detection means detects an amount of variations of the focus error signal at a center of each groove section at a time the light spot crosses a boundary between the land section and the groove section adjacent to the land section as a focus offset amount for the groove sections.

According to the described arrangement, an amount of variations of the focus error signal at the center of the groove section at a time the light spot crosses the boundary between the land section and the groove section can be detected as a focus offset amount for the land sections, whereby an optimal focus offset amount for tracking the groove sections can be detected with accuracy.

To realize the described structures of the present invention, the optical recording/reproducing device may be arranged so as to further include a comparator for inputting thereto a tracking error signal when the light spot passes a boundary between the land section and the groove section adjacent to the land section and sampling means for sampling a focus error signal in the ON state of a focus servo based on an output of the comparator.

The above optical recording/reproducing device may be further arranged such that the comparator outputs a signal whose level varies at a center of each land section as a result of comparison with the reference level, and the sampling means samples a focus error signal when the level of the output signal from the comparator varies.

The described arrangement of the optical information recording/reproducing device of the present invention may be further arranged such that the comparator outputs a signal whose level varies at a center of each groove section as a result of comparison with a predetermined reference level, and the sampling means samples a focus error signal when the level of the output signal from the comparator varies.

To the comparator, input is a tracking error signal obtained at a time the light spot passes a boundary between the land section and the groove section adjacent to the land section, and with an appropriate selection of a reference level, the output level varies at a center of each land section and a center of each groove section as in the above arrangements. The sampling means obtain respective amounts of variations for the land sections and the groove sections by sampling the focus error signal when the level of the output signal from the comparator varies at respective centers of the land section and the groove section.

The described optical information recording/reproducing device of the present invention may be arranged such that the offset amount detection means includes an envelope detector for detecting an envelope of the focus error signal in the ON state of the focus servo at a time the light spot crosses the boundary between the land section and the groove section adjacent to the land section.

As being affected by the crosstalk between the error signals, the focus error signal may be varied with a phase difference of 90° from the tracking error signal. Accordingly, the focus error signal shows a peak value and a bottom value at a zero-cross timing of the tracking error signal. Therefore, by sampling the peak value and the bottom value by detecting the envelope of the focus error signal, the respective focus offset amounts for the land sections and the groove sections can be detected.

The optical information recording/reproducing device of the present invention may be arranged so as to further include second signal generation means for generating a second signal of the focus error signal having a phase difference from a tracking error signal of 90°, the second signal showing its peak values at the center of each land section and the center of each groove section in the ON state of the focus servo at a time the light spot crosses the boundary between the land section and the groove section adjacent to the groove section, wherein the second signal is input to the envelope detection means.

As being affected by the crosstalk between the error signals, the focus error signal may vary with a phase difference of 90° from the tracking error signal. On the other hand, variations in the focus error signal due to the positioning inferior of the photodetectors for detecting the focus error signal occur in phase or in reverse phase with the tracking error signal. In this case, since the respective peak and bottom of the focus error signal are deviated from the respective centers of the land section and the groove section, accurate focus offset amounts for the land sections and the groove sections cannot be detected.

According to the described arrangement, the second signal generation means generates a second signal having a phase difference from a tracking error signal of 90°, the second signal showing its peak values at the respective centers of the land section and the groove section of the focus error signal in the ON state of the focus servo at a time the light spot crosses the boundary between the land section and the groove section adjacent to the land section, and detects an envelope of the resulting second signal. Therefore, even if the focus error signal varies due to the positioning error, the respective focus offset amounts for the land section and the groove section can be detected with accuracy.

The above optical information recording/reproducing device of the present invention may be further arranged such that the second signal generation means is composed of difference signal generation means for subtracting tracking error signals multiplied by k from a focus error signal in the ON state of the focus servo at a time the light spot crosses the boundary between the land section and the groove section adjacent to the land section, wherein k is obtained by the following equation:

$k=\{B\cdot\cos(2\pi\cdot\theta)\}/A$, wherein A is an amplitude of a tracking error signal, B is an amplitude of a focus error signal in the ON state of the focus servo when the light spot passes the boundary between the land section and the groove section adjacent to the land section, and θ is a phase difference between the focus error signal and the tracking error signal.

The described structure provides a concrete example of the second signal generation means of the present invention, i.e., the second signal is obtained by subtracting the tracking signal multiplied by k from the focus error signal in the ON state of the focus servo at a time the light spot crosses the boundary between the land section and the groove section adjacent to the land section.

Each of the described arrangements of the optical recording/reproducing device may be arranged so as to further include control means for controlling the converging means so as to move in a direction of crossing the boundary between the land section and the groove section adjacent to the land section by means of the drive means provided in the optical pickup for use in controlling a servo when detecting the focus offset amount.

According to the described arrangement, the control means moves the converging means in the direction of crossing the boundary between the land section and the groove section adjacent to the land section by means of the drive means, even in the case where the eccentricity of the track is small, and the track cross frequency generated by the eccentricity is smaller than the frequency band of the focus servo, by purposely zero-crossing the tracking error signal, the detection of the focus offset amount can be performed.

In each of the described arrangements, the optical information recording/reproducing device of the present invention includes control means for moving the optical pickup by means of the drive means for use in accessing the optical pickup when detecting the amount of the focus offset.

According to the described arrangement, the control means moves the optical pickup in the direction of crossing the boundary between the land section and the groove section adjacent to the land section by means of the drive means for driving the optical pickup. Therefore, even in the case where the eccentricity of the track is small, and the track cross frequency generated by the eccentricity is smaller than the frequency band of the focus servo, by purposely zero-crossing the tracking error signal, the detection of the focus offset amount can be performed.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. An optical information recording/reproducing device for recording/reproducing information by converging light on a recording medium including land sections and groove sections and detecting a light reflected therefrom using an optical pickup, comprising:

offset amount detection means for detecting focus offset amounts, said offset amount detection means including sampling circuitry which detects the focus offset amounts in response to a tracking error signal by sampling the respective levels of a focus error signal when a light spot is on a center of a land section while crossing a land section/groove section boundary and when a light spot is on a center of a groove section while crossing a land section/groove section boundary, and focus error signal compensation means for compensating the focus error signal based on the respective focus offset amounts detected by said offset amount detection means, to thereby obtain respective optimal focus positions for the land sections and the groove sections.

2. The information recording/reproducing device as set forth in claim 1, wherein:

the sampling circuitry of said offset amount detection means detects a focus offset amount for the land sections by sampling the level of the focus error signal at the center of each land section.

3. The information recording/reproducing device as set forth in claim 1, wherein:

the sampling circuitry of said offset amount detection means detects a focus offset amount for the groove sections by sampling the level of the focus error signal at the center of each groove section.

4. The optical information recording/reproducing device as set forth in claim 1, wherein:

said offset amount detection means further includes a comparator which outputs the tracking error signal when a light spot crosses a land section/groove section boundary; and the sampling circuitry of said offset amount detection means comprises sampling means for sampling the focus error signal in an ON state of a focus servo based on an output from said comparator.

5. The optical information recording/reproducing device as set forth in claim 4, wherein:

said comparator outputs a signal whose level varies at a center of each land section as a result of comparison with a predetermined reference level, and said sampling means samples a focus error signal when varying an output signal from said comparator.

6. The optical information recording/reproducing device as set forth in claim 4, wherein:

said comparator outputs a signal whose level varies at a center of each groove section as a result of comparison with a predetermined reference level, and said sampling means samples a focus error signal when varying an output signal from said comparator.

7. The optical information recording/reproducing device as set forth in claim 1, wherein:

said offset amount detection means further includes envelope detection means for detecting an envelope of the focus error signal in an ON state of a focus servo when a light spot crosses a land section/groove section boundary.

8. The optical information recording/reproducing device as set forth in claim 7, wherein:

said offset amount detection means further includes signal generation means for generating a signal having a phase difference from a tracking error signal of 90°, said signal showing respective peak values at a center of each land section and a center of each groove section in the ON state of the focus servo when a light spot crosses a land section/groove section boundary, wherein said signal is input to said envelope detection means.

9. The optical information recording/reproducing device as set forth in claim 8, wherein:

said signal generation means is composed of difference signal generation means for subtracting tracking error signals multiplied by k from the focus error signal in the ON state of the focus servo when a light spot crosses a land section/groove section boundary, wherein k is obtained by the following equation:

$$k=\{B\cdot\cos(2\pi\cdot\theta)\}/A,$$

wherein A is an amplitude of a tracking error signal, B is an amplitude of a focus error signal in the ON state of the focus servo when a light spot crosses a land section/groove section boundary, and $\theta$ is a phase difference between the focus error signal and the tracking error signal.

10. The optical information recording/reproducing device as set forth in claim 1, wherein:

said offset amount detection means detects the focus offset amounts at a start of a focus servo for reading out initial data, which is to be carried out when inserting the recording medium into said device.

11. The optical information recording/reproducing device as set forth in claim 1, further comprising:

control means for moving converging means in a direction of crossing the boundary between the land section and the groove section adjacent to the land section by means of drive means for driving the converging means provided in said optical pickup for use in controlling servo.

12. The optical information recording/reproducing device as set forth in claim 1, comprising:

control means for moving said optical pickup in a direction of crossing the boundary between the land section and the groove section adjacent to the land section by means of drive means for use in an access operation of said optical pickup.

13. The optical information recording/reproducing device as set forth in claim 1, wherein:

said focus error signal compensation means compensates the focus error signal by adding the focus offset amounts to the focus error signal.

14. The optical information recording/reproducing device as set forth in claim 1, further comprising:

a plurality of light receiving sections for receiving light reflected from the recording medium for generating the focus offset signal, wherein said focus error signal compensation means compensates the focus error signal by controlling an electric amplifier ratio of an output from each light receiving section based on the focus offset amount detected by said offset amount detection means.

15. An optical information recording/reproducing device for recording/reproducing information using a light beam with respect to both groove sections and land sections of an optical disk, comprising:

offset amount detection means for detecting focus offset amounts, said offset amount detection means including sampling circuitry which detects the focus offset amounts in response to a tracking error signal by sampling the respective levels of a focus error signal when a light spot is on a center of a land section while crossing a land section/groove section boundary and when a light spot is on a center of a groove section while crossing a land section/groove section boundary, and focus error signal compensation means for compensating the focus error signal based on the respective focus offset amounts detected by said offset amount detection means, to thereby obtain respective optimal focus positions for the land sections and the groove sections.

16. The optical information recording/reproducing device as set forth in claim 15, wherein:

said offset amount detection means detects a first focus offset amount for the land sections and a second focus offset amount for the groove sections, and said focus error signal compensation means includes switch means for switching between the first focus offset amount and the second focus offset amount, and control means for controlling a switching operation of said switch means depending on whether the tracking position of the light spot is a land section or a groove section.

17. An optical information device which records or reproduces information to or from one or both of groove sections and land sections which occur between the groove sections of an optical medium, the optical information apparatus comprising:

an offset amount detector which detects focus offset amounts, said offset amount detector including sampling circuitry which detects the focus offset amounts in response to a tracking error signal by sampling the respective levels of a focus error signal when a light spot is on a center of a land section while crossing a land section/groove section boundary and when a light spot is on a center of a groove section while crossing a land section/groove section boundary; and a focus error signal compensation circuit which compensates the focus error signal based on the respective focus offset amounts detected by the offset amount detector, to thereby provide respective optimal focus positions for the land sections and the groove sections.

18. The optical information device as set forth in claim 17, wherein the optical medium is a magneto-optical disk.

19. The optical information device as set forth in claim 17, wherein the optical medium is a phase-change optical disk.

20. The optical information device as set forth in claim 17, further comprising:

a photodetector which generates the focus error signal based on light reflected from the optical medium.

21. The optical information device as set forth in claim 20, wherein the photodetector comprises first, second, third and fourth photodetector sections having respective outputs Sa, Sb, Sc and Sd and the focus error signal is calculated in accordance with the equation (Sa+Sd)−(Sb+Sc).

22. The optical information device as set forth in claim 21, wherein the compensated focus error signal is calculated in accordance with the equation (Sa+Sd)−(Sb+Sc)=X, where X is a first focus offset amount for land sections or a second focus offset amount for groove sections.

23. An optical information device which records or reproduces information to or from one or both of groove section and land sections which occur between the groove section of an optical medium, the optical information apparatus comprising:

an offset amount detector which detects focus offset amounts by detecting the respective levels of a focus error signal when a light spot is on a center of a land section while crossing a land section/groove section boundary and when a light spot is on a center of a groove section while crossing a land section/groove section boundary; and a focus error signal compensation circuit which compensates the focus error signal based on the respective focus offset amounts detected by the offset amount detector, to thereby provide respective optimal focus positions for the land sections and the groove sections, wherein the focus error signal compensation circuit comprises:

a first sample and hold circuit for sampling the focus error signal at the center of a land section and holding the sampled signal as a first focus offset amount; and a second sample and hold circuit for sampling the focus error signal at the center of a groove section and holding the sampled signal as a second focus offset amount.

24. An optical information device which records or reproduces information to or from one or both of groove section and land sections which occur between the groove section of an optical medium, the optical information apparatus comprising:

an offset amount detector which detects focus offset amounts by detecting the respective levels of a focus error signal when a light spot is on a center of a land section while crossing a land section/groove section boundary and when a light spot is on a center of a groove section while crossing a land section/groove section boundary; and a focus error signal compensation circuit which compensates the focus error signal based on the respective focus offset amounts detected by the offset amount detector, to thereby provide respective optimal focus positions for the land sections and the groove sections, wherein the focus error signal compensation circuit comprises:

an amplifier supplied with a tracking error signal;

a difference detector supplied with the uncompensated focus error signal and the output of the amplifier;

envelope detectors each supplied with the output of the difference detector for respectively detecting the peak and bottom of the output of the difference detector; and sample and hold circuits for respectively holding the peak and bottom values, wherein the outputs of the sample and hold circuits are first and second focus offset amounts respectively.

25. The optical information device as set forth in claim 17, further comprising:

photodetectors for detecting an information signal from the optical medium.

26. The optical information device as set forth in claim 17, wherein the focus error signal compensation circuit purposely generates light spot crossings of land section/groove section boundaries.

27. A servo control system for an optical information device which records or reproduces information to or from one or both of groove sections and land sections which occur between the groove sections of an optical medium, the servo control system comprising:

a tracking servo control circuit which drives a tracking actuator for tracking land sections or groove sections based on a tracking error signal supplied thereto which has zero crossings when a light spot is substantially at a center of a land section while crossing a land section/groove section boundary and when a light spot is substantially at a center of a groove section while crossing a land section/groove section boundary;

a focus servo control circuit for driving a focusing actuator based on a focus error signal supplied thereto;

a controller; and a switch which is supplied with a switching signal from the controller for supplying either a first focus offset amount for land sections or a second focus offset amount for groove sections to the focus servo control circuit, wherein the focus servo control circuit comprises a focus error signal compensation circuit which compensates the focus error signal based on the first or second focus offset amounts determined by sampling the focus error signal at the zero crossings of the tracking error signal and the focusing actuator is driven based on the compensated focus error signal.

28. The servo control system as set forth in claim 27, wherein the focus error signal compensation circuit comprises:

a first sample and hold circuit for sampling the focus error signal at the center of a groove section and holding the sampled signal as the first focus offset amount; and a second sample and hold circuit for sampling the focus error signal at the center of a land section and holding the sampled signal as the second focus offset amount.

29. The servo control system as set forth in claim 27, wherein the focus error signal compensation circuit comprises:

an amplifier supplied with the tracking error signal;

a difference detector supplied with the uncompensated focus error signal and the output of the amplifier;

envelope detectors each supplied with the output of the difference detector for respectively detecting the peak and bottom of the output of the difference detector; and sample and hold circuits for respectively holding the peak and bottom values, wherein the outputs of the sample and hold circuits are the first and second focus offset amounts respectively.

* * * * *